July 3, 1945.   S. R. BLACKSTONE   2,379,676
FISHING FLOAT
Filed Jan. 10, 1944
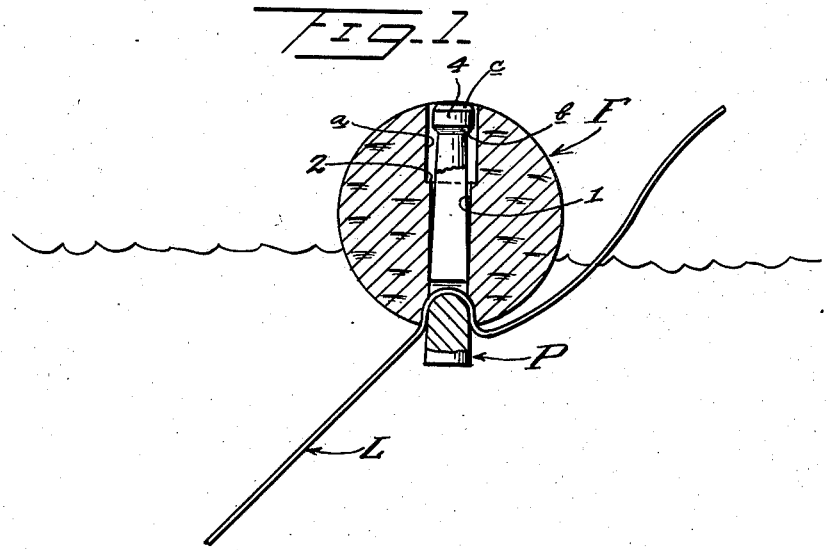
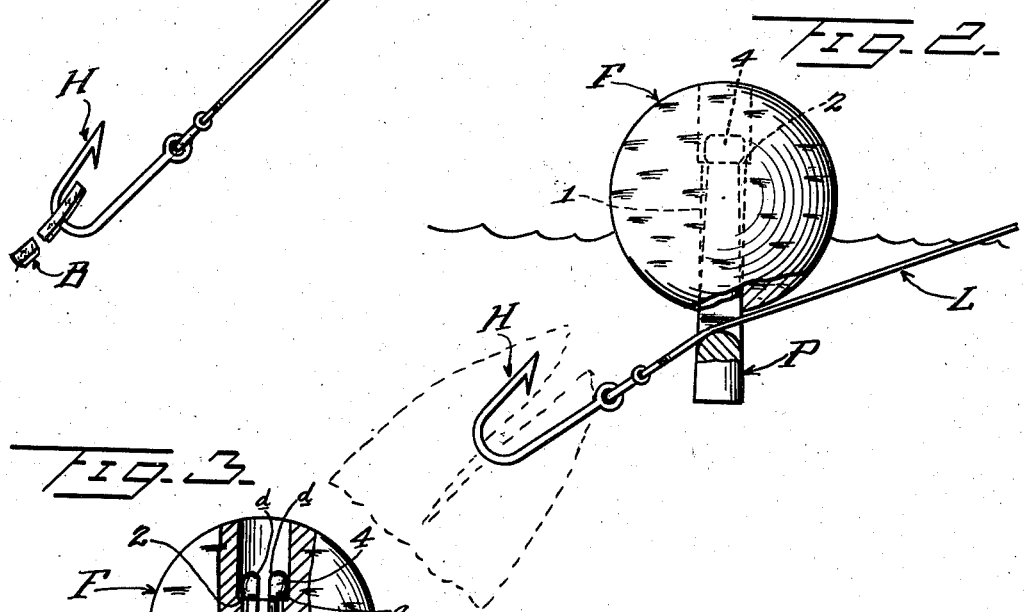
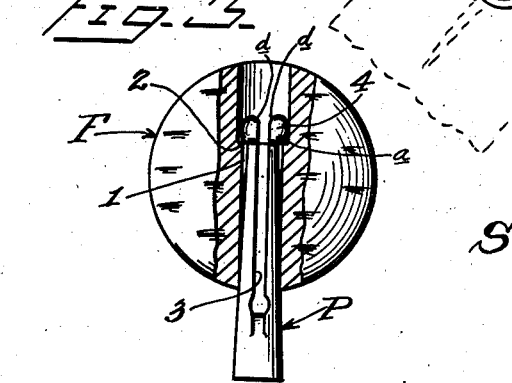
Inventor
Selwyn R. Blackstone
By Wilfred Lawson
Attorney Patented July 3, 1945

2,379,676

UNITED STATES PATENT OFFICE 2,379,676

FISHING FLOAT

Selwyn Reid Blackstone, Madison, Wis.

Application January 10, 1944, Serial No. 517,719

3 Claims. (Cl. 43—49)

This invention relates to a fishing float and it is primarily an object of the invention to provide a float advantageous for use both in still fishing and trolling.

It is also a particular object of the invention to provide a float including means whereby the same may be fixed to a line at a desired point thereon but in a manner whereby such attachment will be released upon excessive pull or weight on the hook end portion of the line to allow the hook and its catch to be pulled or reeled close to the side of a boat or the tip of a fishing rod to thereby materially facilitate the landing of the catch.

It is also an object of the invention to provide a float of this kind having associated therewith means for detachably securing the float to the line in a manner whereby such attachment is released upon excessive pull at the hook end of the line to allow free movement of the float along the line but at the same time holding the float to the line to prevent loss of the float.

The invention consists in the details of construction and in the combination and arrangement of the several parts of my improved fishing float whereby certain important advantages are attained, as will be hereinafter more fully set forth.

In order that my invention may be better understood, I will now proceed to describe the same with reference to the accompanying drawing, wherein:

Figure 1, is a view partly in elevation and partly in section illustrating a float constructed in accordance with an embodiment of the invention and in initial fixed position on the line;

Figure 2, is a view similar to Figure 1, but showing the float in release with respect to the line; and Figure 3, is a view partly in elevation and partly in section of the float as herein disclosed unapplied, the line of section being at right angles to the line of section in either Figures 1 or 2, and the holding pin in release position as illustrated in Figure 2.

As illustrated in the accompanying drawing, F denotes a body member of cork or other buoyant material and which in the present embodiment of the invention is spherical and, of course, of selected radius. Disposed radially and entirely through the body member F is a bore 1, having one end portion $a$, enlarged or countersunk whereby is provided a shoulder 2.

Insertible within the opening 1, at the smaller end thereof is an elongated tapered pin P, provided along its reduced portion, for a major distance along the pin, with a kerf 3, to enable desired contraction of the pin P to permit the insertion of the pin P into the opening 1 at the smaller end thereof.

The pin P, as shown in the accompanying drawing, is of a length in excess of the diameter of the body member F, and the smaller end portion of the pin P, is provided with an enlarged head or knob 4, of a major diameter greater than the diameter of the opening 1, at the junction with the enlarged or countersunk portion $a$, so that the normal expansion of the smaller end portion of the pin P will assure the head or knob 4 being so arranged to have contact with the shoulder 2, to limit outward endwise movement of the pin P, except when it is desired to entirely remove the pin P. Proper manual pull upon the pin will effect the required contraction of the smaller end portion of the pin to permit passage of the head or knob 4, through the opening 1. To facilitate this withdrawal of the pin P the inner portions of the head or knob 4, are beveled, as at $b$.

Contraction of the smaller end portion of the pin P, also allows the desired insertion of the pin into the opening 1, and to facilitate this insertion the outer portions of the head or knob 4, are also beveled as at $c$.

It is to be particularly pointed out that the enlarged or countersunk portion $a$ of the opening 1 is of such length or depth to allow the closed end portion of the kerf 3, of the pin P to extend, as shown in Figure 2, a material distance outwardly beyond the body member F when the head or knob 4 is in contact with the shoulder 2. It will also be noted in Figure 1, of the drawing, that the pin P, is of such length and the outer or larger end portion thereof of such diameter, that when the pin P has been wedged into the opening 1, the inner or closed end of the kerf 3, of the pin P, is a considerable distance within the body member F.

In practice, the pin P is placed at a desired point on the fishing line L, with respect to the hook H, and to facilitate the application of the pin P, on the line L, the opposed faces or walls of the kerf 3, at the outer or free extremities thereof are outwardly beveled, as at $d$.

After the pin P has been applied to the line L, the pin is pressed and wedged into the opening 1, of the body member F, to clamp the line L to the body member F, strong enough to hold the weight of the hook H, and the bait B, applied to the hook H. After a fish has been caught on the hook H, the pull upon the line L, required in landing the fish, will result in the pin P being shifted outwardly of the body member F, at a distance sufficient to bring, as shown in Figure 2, the closed end of the kerf 3, of the pin P, outwardly beyond the body member F, so that said body member F, is released from fixed connection to the line L. This release will permit the body member F to freely slide down along the line L as the fish is drawn or reeled in and thus facilitate the landing of the fish as the fish can be drawn in close to the boat or in close to the tip of a fishing rod.

When the pin P is in release position, as shown in Figure 2, the pin is held against complete withdrawal, except by abnormal pull such as a manual operation, by contact of the head 4, with the shoulder 2, of the pin P, when the fishing line may be inserted, the furcations being of resilient character to be flexed together, the pin having a head at the said one end adapted upon flexing the furcations together to pass through the small cylindrical part of the bore into the enlarged part, the outer sides of the head opposing said shoulder when in the enlarged part of the bore, and the pin being of a diameter to frictionally hold the line between the pin and the wall of the smaller part of the bore.

2. A fishing float, comprising a buoyant body having a bore enlarged through a shoulder part of the length to form a shoulder, a pin of either of resilient character to be flexed forether, the pin having a head at the said one end adapted upon flexing the furcations together to pass through the smaller part of the bore into the enlarged part, the outer sides of the head opposing said shoulder when in the enlarged part of the bore, and the pin being of a diameter to frictionally hold the line between the pin and the wall of the smallest part of the bore.